UNITED STATES PATENT OFFICE.

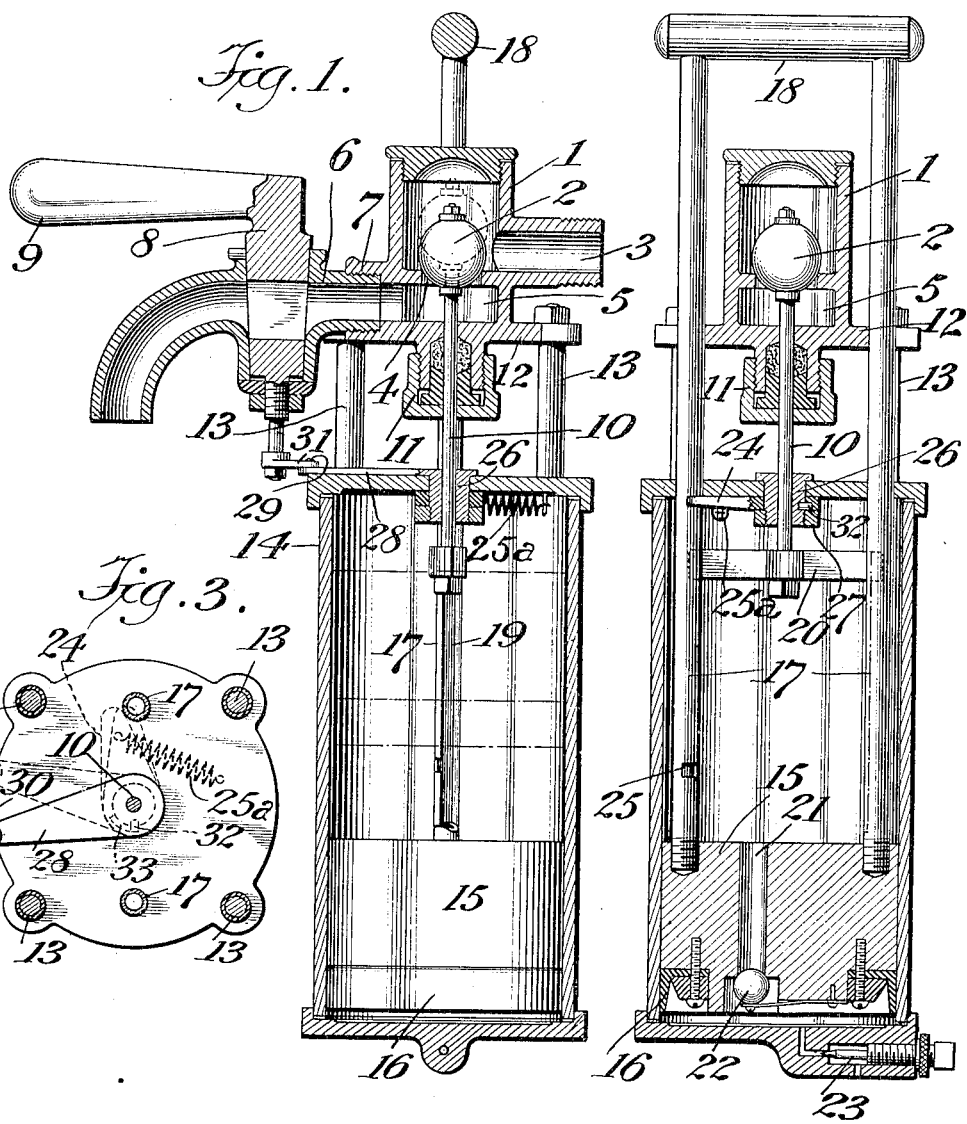

HOSEA N. DENNY, OF NEW YORK, N. Y.

LIQUID-METER.

No. 849,602.　　Specification of Letters Patent.　　Patented April 9, 1907.

Application filed November 5, 1906. Serial No. 342,024.

*To all whom it may concern:*

Be it known that I, HOSEA N. DENNY, a citizen of the United States, residing in the city of New York, county of Kings, and State of New York, have invented a new and useful Improvement in Liquid-Meters, of which the following is a specification.

This invention relates to liquid-meters, and has as its principal object the provision of a liquid-meter characterized by simplicity and compactness of construction, reliability in operation, and ease of adjustment to measure different quantities of liquid at each operation.

A further object of the invention is to provide a liquid-meter having valve-closing devices of simple and durable design which are readily accessible for adjustment or replacement and which are not exposed to the action of the liquid to be measured.

The present invention relates especially to liquid-meters of the character employed in measuring predetermined quantities of liquids and adapted primarily for use in stores for measuring liquids rapidly and accurately without the use of an ordinary measuring-receptacle. The invention may, however, be embodied in flushometers and other liquid-meters where an automatic liquid-meter is required.

In the accompanying drawings, in which corresponding parts are designated by similar characters of reference in the several views, I have illustrated a single embodiment of my invention only; but it is to be understood that changes in the details of construction may be made within the scope of the appended claims without departing from the spirit of the invention.

In the drawings, Figure 1 is a view in vertical section through the entire liquid-meter. Fig. 2 is a view also in vertical section in a plane at right angles to the plane of Fig. 1. Fig. 3 is a top plan view of the weight, cylinder, and latch-releasing devices, the parts above being removed.

In its most essential elements the present invention comprises a valve to control the flow of liquid to be measured, valve-closing devices operated by gravity, and means for controlling the operation of the valve-closing devices. These elements are so constructed and arranged that the valve only is exposed to the action of the liquid to be measured and the valve-closing devices are wholly exterior to the valve-casing and are readily accessible for adjustment or repair. In addition to the essential elements mentioned I provide a supplemental valve or cock, which is opened and closed by hand and which serves to prevent the flow of liquid as soon as the main valve is opened. This supplemental valve is associated with a latch mechanism by which the valve-closing devices are held inoperative until after the opening of the supplemental valve.

Referring to the drawings by the reference characters, 1 designates the casing of the main valve 2, which is preferably of the ball type. An inlet-pipe 3 admits the liquid to the casing 1, and the liquid escapes from the casing through the port 4, in which the valve 2 seats. Beneath the port 4 is a sort of supplemental chamber 5, into which the liquid passes when the valve 2 is opened, and an ordinary faucet 6 is threaded into a lateral tubular extension 7 from the chamber 5. The faucet 6 comprises the supplemental valve or cock 8, which is of the ordinary rotatable type and is provided with a handle 9, by which it may be manually operated. The stem 10 extends downward from the valve 2 through a suitable stuffing-box or gland 11, and the friction developed between the valve-stem and the packing inclosed in the stuffing-box is sufficient to hold the valve open when raised to the position shown in dotted lines in Fig. 1. The valve-casing 1 is provided at the bottom with a base-plate 12, which is supported on four upwardly-extending rods 13, which are mounted on the top of a vertical cylinder 14. Inclosed in the cylinder 14 is a weight 15, which is arranged to slide therein, and is provided at the bottom with a bushing 16, of oiled leather or the like, to prevent the passage of air between the cylinder-wall and the weight when the weight is descending in the cylinder. The weight 15 is attached to a pair of upwardly-extending rods 17, which are connected above the valve-casing 1 by a yoke 18, which serves as a handle by which the rods and the weight secured thereto may be raised. Each rod is preferably hollow throughout a portion of its length, at least, and provided with a slot 19, extending longitudinally for a certain distance above the weight. A cross-bar 20, fitted on the lower end of the valve-stem 10, which extends through the top of the cylinder, works in the slots 19 of the two lifting-rods 17. The weight 15 is bored through from top to bottom, as shown at 21, and a spring-controlled valve 22 is provided at the bottom of the bore to permit the passage of air downward through the bore when the weight is raised, but prevent air from passing upwardly through the bore during the descent of the weight. The escape of air from the lower portion of the cylinder during the descent of the weight is controlled by an adjustable needle-valve 23, provided in the lower end of the cylinder, as shown in Fig. 2.

When the weight 15 is in the position shown in Figs. 1 and 2, it is supported on the cross-bar 20 at the lower end of the valve-stem 10, and the valve 2 is held firmly upon its seat. The cross-bar 20 at the end of the valve-stem is then in contact with the upper ends of the slots 19 in the two weight-supporting rods 17, and the descent of the weight to the bottom of the cylinder is so prevented. When the weight is raised by grasping the handle 18 and drawing the rods 17 upward, the air in the upper portion of the cylinder passes through the bore 21, past the valve 22, and into the lower portion of the cylinder. As the weight nears the top of the cylinder it engages the lower end of the valve-stem 10 and raises the valve off its seat to the extent shown in dotted lines in Fig. 1. When the weight reaches the upward limit of its movement, it is secured by the engagement of a spring-latch 24 with a notch 25, formed in one of the rods 17. The latch 24 is controlled by a small spring 25$^a$, secured on the under side of the cylinder-top, and is supported upon a sleeve 26, encircling the valve-stem 10 and rotatably mounted in the top of the cylinder. The sleeve 26 is provided on its lower end with a nut 27, by which the latch 24 is secured in place, and on its upper end is formed an arm 28, which extends laterally to the edge of the cylinder-top. This arm 28 bears at its end a pin 29, which engages a slot 30 in a short arm 31, secured on the bottom of the supplementary valve 8. The latch 24 has only a limited rotative movement on the sleeve 26. A small pin 32, set into the sleeve and working in a recess 33, formed in the head of the latch, limits the movement of the latch on the sleeve. This pin is so placed that when the supplemental valve 8 is in the position shown in Fig. 1 and the arm 29 is in the position shown in solid lines in Fig. 3 the latch 24 is held out of engagement with the notch 25; but when the valve 8 is closed and the arm 29 is in the position shown in dotted lines in Fig. 3 the latch 24 is pressed against the adjacent rod 17 by its spring and engages the notch 25 as soon as the weight 15 is raised to the upward limit of its movement.

As shown in Figs. 1 and 2, the parts of the liquid-meter are in the position occupied at the end of the measuring operation. Before the next measuring operation the valve 8 should be closed by turning it through an arc of ninety degrees, and so swinging the arm 31 from the position shown in solid lines in Fig. 3 to that shown in dotted lines. The shifting of the arm 31, and with it the arm 29, releases the latch 24 from engagement with the pin 32 and leaves it free to move under the influence of the spring 25. The closure of the valve 8 also makes it impossible for liquid to pass through the faucet as soon as the valve 2 begins to open. The valve 8 having been closed, the apparatus is ready for the next measuring operation, which is begun by raising the weight 15 to the upward limit of its movement by means of the handle 18, connecting the two lifting-rods 17. The valve 2 is opened by the weight during the latter part of its upward movement, and when the notch 25 comes into position for engagement by the latch 24 the weight is locked in its uppermost position and the valve 2 is held open to the full extent. If the supplemental valve is then opened to its full extent, the arm 31 and the arm 29 are thrown into the position shown in solid lines in Fig. 3 and the pin 32, carried by the sleeve 26, engages one end of the recess 33 in the head of the latch 24, disengaging the latch from the notch 25 and leaving the weight 15 free to descend in the cylinder 14. The descent of the weight in the cylinder is determined by the rate at which the air contained in the lower portion of the cylinder is allowed to escape, and this is regulated by means of the needle-valve 23. During the greater portion of the descent of the weight 15 the valve 2 remains open to the full extent, (indicated in dotted lines in Fig. 1;) but as the weight nears the position shown in solid lines in Figs. 1 and 2 the upper ends of the slots 19 in the weight-carrying rods 17 engage the ends of the cross-bar 20 and force the valve 2 home upon its seat, so cutting off the flow of liquid through the valve-casing. At the end of the measuring operation after the closure of the valve 2 the valve 8 should be completely closed prior to the next measuring operation.

From the foregoing description it will be seen that the entire structure of the liquid-meter is of simple design and of such construction that there is little liability for any part to become injured by the operation or to be deranged. It is also clear that the valve-operating devices are readily accessible, so that they can be adjusted or repaired with little difficulty and without opening the valve-casing. The adjustment of the meter for measuring different quantities of liquid is very readily effected by means of the valve 23, which may be calibrated for this purpose.

In the foregoing description and the accompanying drawings I have shown a weight as furnishing the energy by which the controlling-valve is closed to cut off the flow of liquid, and I preferably employ a weight for this purpose; but it is obvious that other devices may be used to supply the necessary energy to effect the closure of the controlling-valve—such as, for example, a spring, which is for the purposes of my invention a well-recognized equivalent for a weight.

Having thus described my invention, what I claim as new, and desire to secure by Letters Patent, is—

1. In a liquid-meter, a valve to control the flow of liquid, a weight, means independent of the liquid to be measured for retarding the descent of the weight, and connections between the weight and the valve whereby the valve is opened by the weight after the weight is raised to a predetermined height and whereby the valve is closed after the weight has descended to a predetermined level.

2. In a liquid-meter, a valve for controlling the flow of liquid which is normally closed, a weight, pneumatic devices for retarding the descent of the weight, and connections between the weight and the valve whereby the valve is opened after the weight is raised to a predetermined height and closed after the weight has descended to a predetermined level.

3. In a liquid-meter, a valve to control the flow of liquid which is normally closed, a cylinder, a weight arranged for vertical movement in said cylinder and adapted to expel air from the cylinder during its descent, means for controlling the escape of air from the lower portion of the cylinder during the descent of the weight, connections between the weight and the valve whereby the valve is opened after the weight is raised to a predetermined height and closed after the weight has descended to a predetermined level.

4. In a liquid-meter, a valve for controlling the flow of liquid, a cylinder, a weight arranged for vertical sliding movement in said cylinder and adapted to expel air from the cylinder during its descent, a valve in said weight to permit the passage of air through the weight when the weight is raised, means for controlling the rate of escape of air from the lower portion of the cylinder during the descent of the weight, and connections between the weight and the valve for controlling the flow of liquid whereby said valve is opened after the weight is raised to a predetermined height and closed after the weight has descended to a predetermined level.

5. In a liquid-meter, a valve for controlling the flow of liquid, a cylinder, a weight arranged for sliding movement in the cylinder and adapted to expel air from the cylinder during its descent, a valve-stem extending from said valve into the upper portion of the cylinder and adapted to be engaged by the weight after the weight is raised to a predetermined height, and connections between the valve-stem and the weight whereby the valve is closed by the descent of the weight after the weight has descended to a predetermined level.

6. In a liquid-meter, a valve to control the flow of liquid, a weight, connections between the valve and the weight whereby the valve is opened after the weight is raised to a predetermined height and whereby the valve is closed after the weight has descended to a predetermined level, a supplemental valve through which the liquid must pass after passing through the controlling-valve, latch mechanism adapted to hold said weight in raised position when the supplemental valve is closed, and connections between said supplemental valve and said latch mechanism whereby the valve is disengaged and the weight is allowed to descend when the supplemental valve is opened.

7. In a liquid-meter, a cylinder, a weight arranged to slide vertically in said cylinder, a valve to control the flow of liquid, a valve-stem connected with said valve and extending within said cylinder, a weight-lifting rod attached to said weight and extending upward through the top of said cylinder, said rod having a slot extending longitudinally throughout a portion of its length and an arm attached to said valve-stem and extending into said slot, whereby the descent of the weight below a predetermined point effects the closure of the valve.

In testimony whereof I have signed my name in the presence of two witnesses.

HOSEA N. DENNY.

Witnesses:
WM. BRADFORD,
BAXTER MORTON.